US012624562B2

(12) United States Patent
Bruneel et al.

(10) Patent No.: US 12,624,562 B2
(45) Date of Patent: May 12, 2026

(54) VACUUM CLEANER ROBOT WITH A DUAL-OUTLET VOLUTE FOR CLEANING SWIMMING POOLS

(71) Applicant: KOKIDO DEVELOPMENT LIMITED, Kowloon (HK)

(72) Inventors: Jean Bruneel, Kowloon (HK); Max Roumagnac, Martignas sur Jalle (FR)

(73) Assignee: KOKIDO DEVELOPMENT LIMITED, Kowloon (HK)

( * ) Notice: Subject to any disclaimer, the term of this patent is extended or adjusted under 35 U.S.C. 154(b) by 359 days.

(21) Appl. No.: 18/543,844

(22) Filed: Dec. 18, 2023

(65) Prior Publication Data

US 2024/0247513 A1 Jul. 25, 2024

(30) Foreign Application Priority Data

Jan. 19, 2023 (FR) ....................................... 2300511

(51) Int. Cl.
*E04H 4/16* (2006.01)
*B60L 50/60* (2019.01)

(52) U.S. Cl.
CPC ............ *E04H 4/1663* (2013.01); *B60L 50/66* (2019.02); *B60L 2200/32* (2013.01)

(58) Field of Classification Search
CPC ..... E04H 4/1654; E04H 4/1663; B60L 50/66; B60L 2200/32
See application file for complete search history.

(56) References Cited

U.S. PATENT DOCUMENTS

| | | | |
|---|---|---|---|
| 6,412,133 B1 * | 7/2002 | Erlich | .................... E04H 4/1663 15/1.7 |
| 7,805,792 B2 * | 10/2010 | Roumagnac | .......... E04H 4/1654 210/167.16 |
| 10,370,865 B2 * | 8/2019 | Roumagnac | .............. E04H 4/16 |
| 2002/0129839 A1 | 9/2002 | Erlich et al. | |
| 2007/0157413 A1 | 7/2007 | Roumagnac | |
| 2022/0018149 A1 | 1/2022 | Chen | |

FOREIGN PATENT DOCUMENTS

| | | |
|---|---|---|
| CN | 112591067 | 4/2021 |
| CN | 112623173 | 4/2021 |
| CN | 114687593 | 7/2022 |
| CN | 114837476 | 8/2022 |
| EP | 1022411 | 7/2000 |
| EP | 3805487 | 4/2021 |
| FR | 2896005 | 7/2007 |
| FR | 3041982 | 4/2017 |

OTHER PUBLICATIONS

International Search Report for application No. FR2300511 dated Aug. 11, 2023.

* cited by examiner

*Primary Examiner* — Sabbir Hasan

(74) *Attorney, Agent, or Firm* — Perman & Green, LLP

(57) ABSTRACT

A submersible vacuum cleaner robot for cleaning artificial basins, including: a main body having a debris container; a filter; a volute with two discharge outlets; a suction and propulsion system producing a water circulation in the volute and a propulsive water jet; and electric power supply means, the volute being fixed and including a flap at each of said outlets, each flap having an open position and a closed position, the positions of said flaps automatically alternating according to the direction of the water circulation in the volute so as to reverse the direction of the propulsive water jet.

10 Claims, 4 Drawing Sheets

VACUUM CLEANER ROBOT WITH A DUAL-OUTLET VOLUTE FOR CLEANING SWIMMING POOLS

CROSS-REFERENCE TO RELATED APPLICATIONS

This application is based on and claims priority under 35 U.S.C. § 119 to French Patent Application No. FR2300511, filed on Jan. 19, 2023, in the French Intellectual Property Office, the disclosure of which is incorporated by reference herein in its entirety.

BACKGROUND

Field

The present disclosure relates to the field of vacuum cleaner robots for cleaning swimming pools, in particular propulsive water jet vacuum cleaner robots, and relates more particularly to a vacuum cleaner robot comprising a dual-outlet volute enabling an automatic reversal of the direction of movement.

Brief Description of Related Developments

Vacuum cleaner robots for swimming pools with reverse direction of movement are appliances designed to clean the bottoms and the walls of swimming pools in an autonomous manner. They are motor-driven and equipped with means enabling them to move in the water and to detect obstacles.

As a general rule, these vacuum cleaner robots move by means of wheels or tracks and are equipped with means for sucking and filtering the debris and particles in suspension in the water, and possibly with cleaning means such as fixed or rotary brushes to unclog the walls and the bottom of the swimming pool. When these robots detect an obstacle, they reverse their direction of movement to circumvent the obstacle and carry on cleaning.

To cover the entire surface to be cleaned, the robots of this type reverse their direction of movement when encountering an obstacle and move according to a different direction between the back-and-forth movement (zigzag). Numerous obstacle detection and movement direction reversal means are known.

Some robots, such as that described in the document CN114687593, use two distinct motors, one motor for each direction of movement.

Other robots, simpler and more economical, use a two-directional propulsion system with one single motor and one single turbine placed in a volute.

For such "one-motor" robots, the reversal of the direction of the propulsive water jet, and therefore of the direction of movement, on contact of an obstacle could be achieved:

either with a rotary volute with a unique outlet blocked in two opposite positions, as described in the document FR3041982 (of the same Inventor) or EP3805487;
    or with a fixed volute with two opposite outlets, alternately open or closed by a rotary valve actuated by substantially complex mechanisms, as described in the document CN112623173, CN112591067 or CN114837476.

These two types of current systems are based on the implementation of rotary parts, namely a rotary volute or a fixed volute with a rotary valve, and are consequently relatively complex to make, expensive and could be vulnerable to operating risks in an environment such as a swimming pool (charged water, sand, etc.).

The Applicant has no knowledge of any vacuum cleaner robot with automatic reversal of the direction of movement in which the volute is neither rotary nor does it comprise a rotary valve.

SUMMARY

The present disclosure aims to overcome all or part of the drawbacks of the prior art set out hereinbefore by providing a system with a dual-outlet fixed volute, each outlet being equipped with a flap. Hence, this system, which is mechanically very simple, insensitive to wear and jamming by debris that would not be stopped by the filter (teared filter or forgotten by the user), is reliable and has a reduced manufacturing cost in comparison with the known systems using rotary parts.

To this end, an object of the present disclosure is a submersible robot vacuum cleaner for cleaning artificial basins in particular a swimming pool, including: a main body comprising a debris container; a filter; a volute with two discharge outlets; a suction and propulsion system producing a water circulation in the volute and a propulsive water jet; and electric power supply means. This vacuum cleaner robot is remarkable in that the volute is fixed and includes a flap at each of said outlets having an open position and a closed position, the positions of said flaps automatically alternating according to the direction of the water circulation in the volute so as to reverse the direction of the propulsive water jet, and therefore the direction of movement of the robot.

According to an aspect of the disclosure, the suction and propulsion system comprises an electric motor and a centrifugal turbine coupled to the motor, the rotation of said turbine in one direction producing a water circulation in the volute in the same direction.

Advantageously, the turbine may include vanes that are orientable according to its direction of rotation.

According to an aspect of the disclosure, each flap has a position opposite to that of the other flap when the suction and propulsion system is activated, and a default open position when said system is at stop.

According to another aspect of the disclosure, each flap is subjected to an elastic biasing force which tends to hold it in its open position. In other words, the flaps are monostables, with the open position being the rest position.

More particularly, the biasing force is ensured by a torsion spring, placed in an articulation hinge, or by flexibility of the flap itself.

Quite advantageously, the suction and propulsion system is configured to reverse the direction of water circulation in the volute when the robot is immobilised against an obstacle.

To this end, the robot includes for example a stop sensor for controlling the reversal of the direction of water circulation in the volute.

According to one embodiment, the electric power supply means comprise an electric battery placed in a sealed compartment in order to make the robot autonomous.

According to one embodiment, the robot further includes trajectory deviation means such as a deflector of the propulsive water jet, so that the robot does not follow the same trajectory in the back-and-forth movements.

The fundamental concepts of the disclosure having just been disclosed hereinabove in their most elementary form, other details and features will appear more clearly upon reading the following description and with reference to the appended drawings, giving as a non-limiting example an embodiment of a vacuum cleaner robot with a dual-outlet volute, in accordance with the principles of the disclosure.

BRIEF DESCRIPTION OF THE FIGURES

The figures are given for merely illustrative purposes for a better understanding of the disclosure without limiting its scope. The different elements may be schematically illustrated and are not necessarily plotted to scale. In all figures, identical or equivalent elements bear the same reference numerals.

Thus, there is illustrated in.

DETAILED DESCRIPTION

Figure 1:
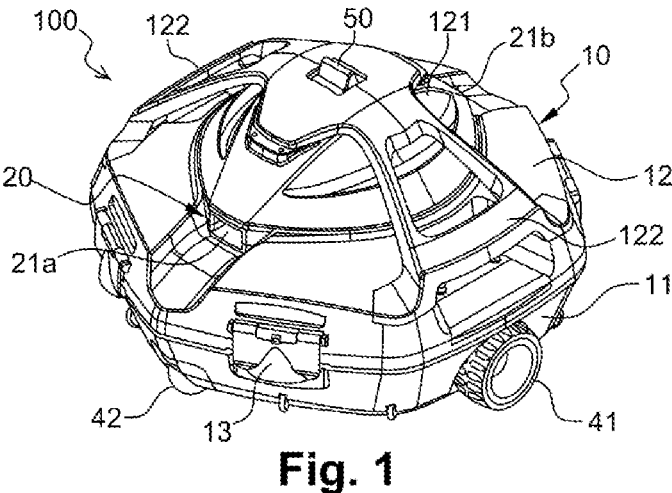
FIG. 1: a perspective view of a vacuum cleaner robot according to an embodiment of the disclosure.
Figure 2:
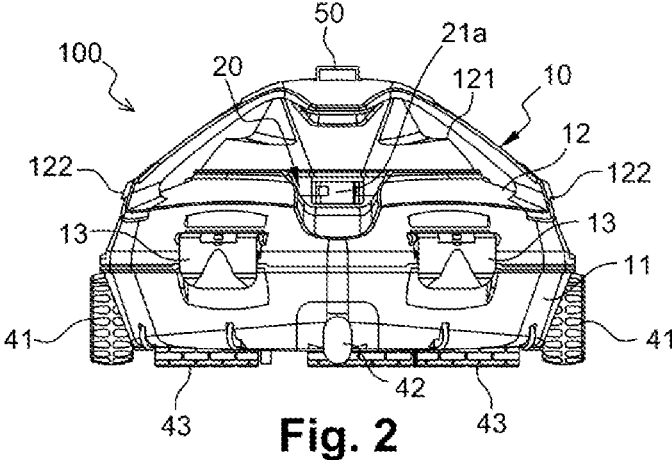
FIG. 2: a front view of the vacuum cleaner robot.
Figure 3:
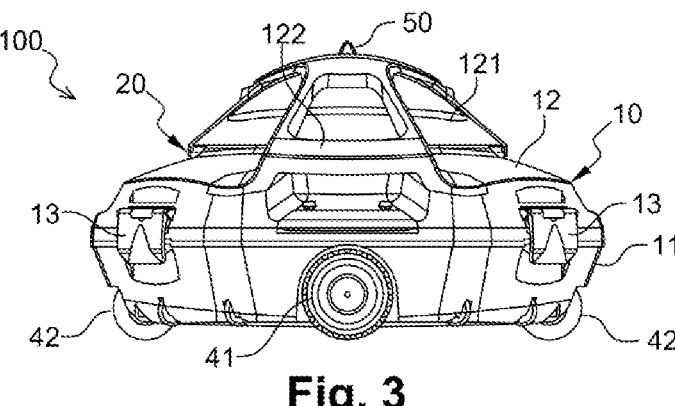
FIG. 3: a side view of the vacuum cleaner robot.
Figure 4:
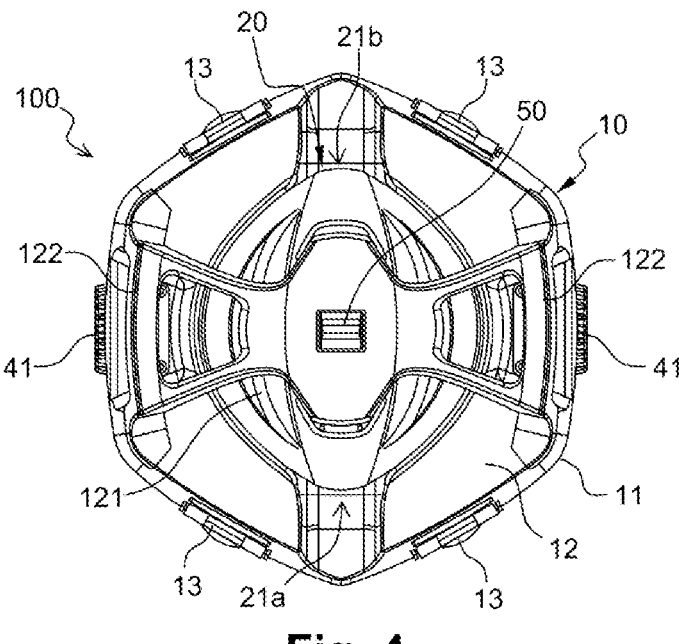
FIG. 4: a top view of the vacuum cleaner robot.

It should be noted that some technical elements well known to a person skilled in the art are herein recalled to avoid any insufficiency or ambiguity in understanding the present disclosure.

In the embodiment described hereinafter, reference is made to a vacuum cleaner robot with a dual-outlet volute enabling an automatic reversal of the direction of movement, intended primarily for swimming pool cleaning. This non-limiting example is given for a better understanding of the disclosure and does not exclude the use of the vacuum cleaner robot to clean other types of basins the shape of the bottom of which enables movement of the robot.

In the present description, the expression "dual-position volute", or simply "dual volute", refers to a volute having two opposite outlets. The two outlets of a dual volute may be diametrically opposite like in the example that will be described.

FIGS. 1 to 5 show the different views of an immersible vacuum cleaner robot 100 with a dual volute, including a main body 10 consisting of a debris container 11 and a cowl 12, a suction and propulsion system placed in said body and allowing sucking the water of the basin before filtering thereof and discharge thereof in the form of a propulsive water jet, and a volute 20 so-called dual volute as it has two outlets 21*a* and 21*b* discharging, one at once, the sucked water according to the direction of movement of the robot.

The vacuum cleaner robot 100 further includes a filter placed in the debris container 11, electric power supply means such as an electric battery, a switch 50, and drive means in particular drive wheels 41, pivoting castors 42 and rollers 43.

According to the illustrated embodiment, the main body 10 has a compact shape for a better stability and a substantially hexagonal contour to better interact with the obstacles and reach the corners of the swimming pool. Of course, other shapes and dimensions are still possible.

The main body 10 is made into two separable portions which are the debris container 11 and the cowl 12. These two portions are assembled in a reversible manner and locked by closure means 13, in particular lever clasps like in the illustrated example. This allows quickly accessing the inside of the main body 10 in order to empty and clean the debris container 11, or to proceed with the maintenance of the robot.

Figure 5:
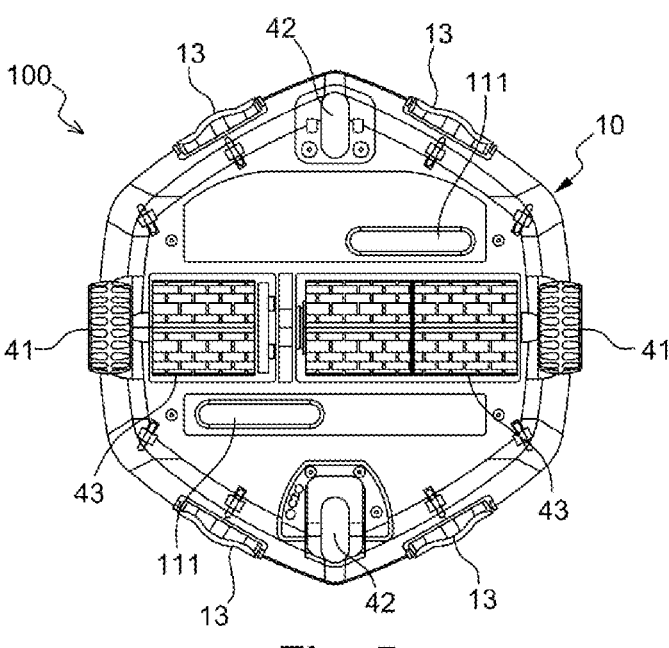
FIG. 5: a bottom view of the vacuum cleaner robot.

The debris container 11 defines an internal volume for collecting the debris sucked and retained by the filter, and includes one or more suction intake(s) 111 visible in FIG. 5.

Preferably, the suction intakes 111 are offset and have reduced sections to increase the suction speed and, therefore, the depression at the inlet of the suction duct, for a more efficient suction.

The cowl 12 closes the debris container 11 and is topped, according to the illustrated example, with a sealed compartment 121 to receive all or part of the electric power supply means as well as other electronic auxiliaries of the vacuum cleaner robot 100.

The cowl 12 further includes gripping means 122 arranged on either side of the robot 100 and enabling the user to open said cowl or simply raise the robot. According to the illustrated example, the gripping means 122 are made in an arcuate structure partially covering the cowl 12.

The suction and propulsion system corresponds to an electrohydraulic motor propulsion unit and conventionally comprises an electric motor and a centrifugal turbine coupled to the latter, with a reduction mechanism with one or more stage(s) therebetween. The turbine is placed in the volute 20 to form the suction pump. Indeed, the rotation of the centrifugal turbine, driven by the motor, produces water suction and discharge thereof at high speed, through one of the outlets 21*a* or 21*b* of the volute.

The outlets 21*a* and 21*b* consist of nozzles discharging the sucked water in the form of a water jet to propel the robot by reaction in the direction opposite to the direction of the water jet.

Figure 6:
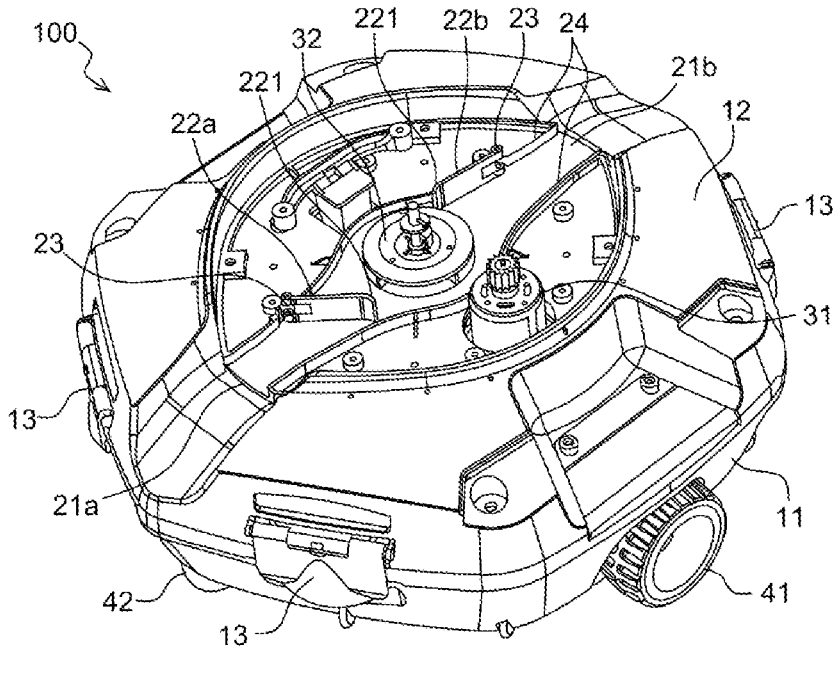
FIG. 6: a perspective view of the vacuum cleaner robot without the sealed compartment, revealing the dual-outlet volute.

FIG. 6 partially shows the vacuum cleaner robot 100 with the sealed compartment being removed, revealing the volute 20 and its two outlets 21*a* and 21*b*.

According to this embodiment, the suction and propulsion system comprises an electric motor 31, placed partially under the cowl 12, and a centrifugal turbine 32, with four or five vanes for example, placed at the centre of the volute 20. The suction and propulsion system also comprises, between the motor 31 and the turbine 32, reduction pinions which are not shown, only the first pinion mounted on the shaft of the motor is visible.

The electric motor 31, and therefore the turbine 32, can rotate in both directions and thus enables the volute 20 to reverse the direction of movement of the robot 100 thanks to two flaps 22*a* and 22*b* mounted respectively at the outlets 21*a* and 21*b*.

Indeed, each flap 22 has two positions: an open position clearing the passage of the corresponding outlet 21; and a closed position blocking said outlet. The positions of a flap alternate with the positions of the other flap during the operation of the robot 100 and impose the direction of movement of the latter. In other words, when a flap is open, the other is closed and vice versa.

Figure 7A:
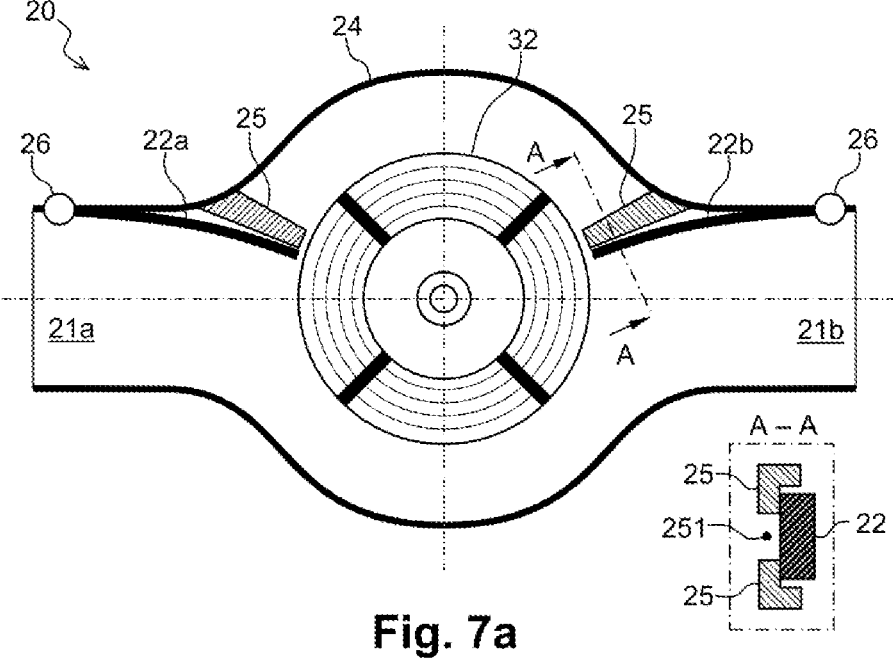
FIG. 7*a*: a diagram of the volute with the flaps in the open position, when the robot is not operating.
Figure 7B:
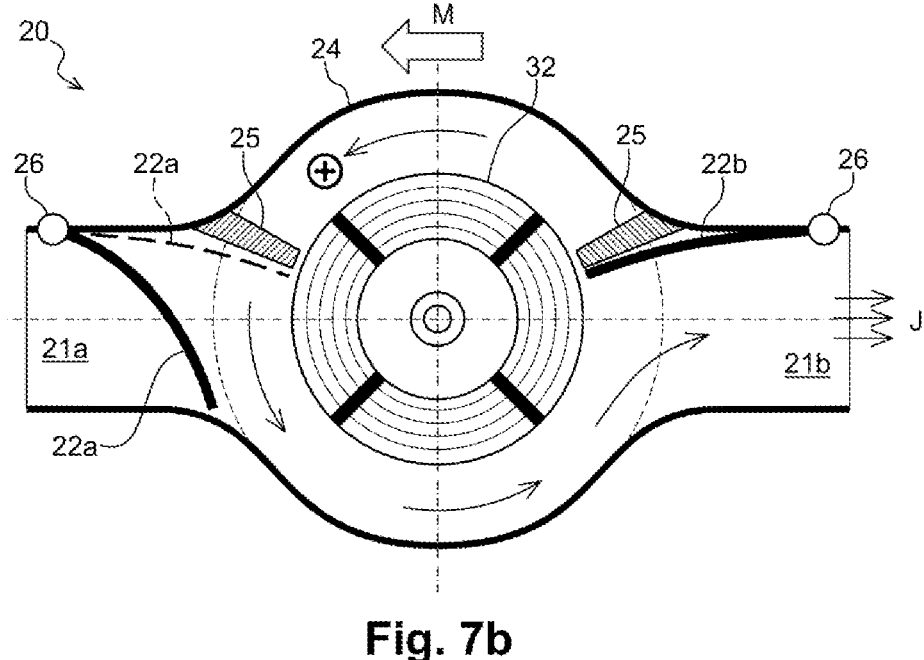
FIG. 7*b*: a diagram of the volute when the robot moves in one direction.
Figure 7C:
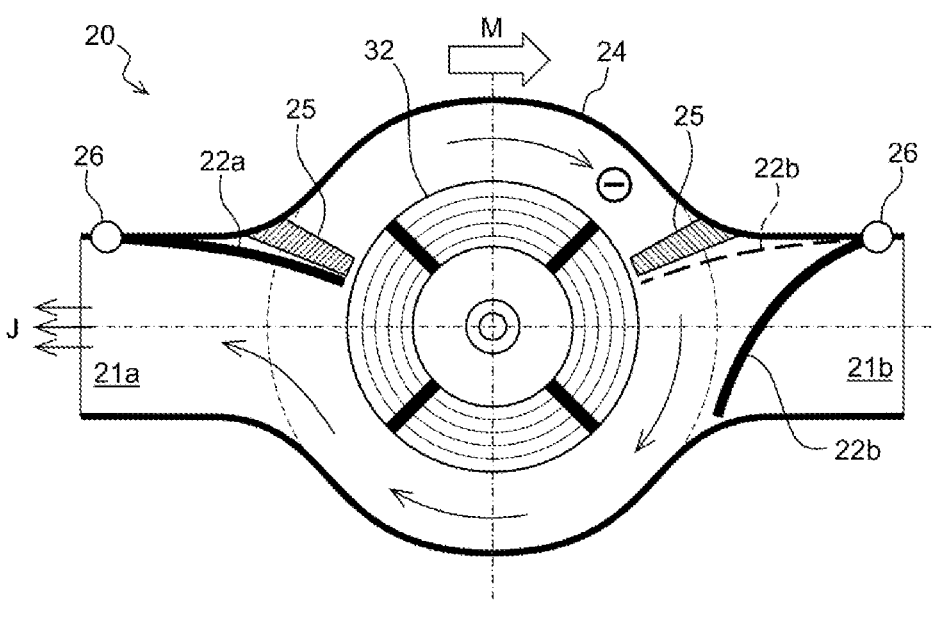
FIG. 7*c*: a diagram of the volute when the robot moves in the reverse direction as that of FIG. 7*b*.

FIGS. 7*a* to 7*c* schematise the principle of the dual volute 20 and allow easily understanding its operation.

FIG. 7*a* shows the volute 20 when the robot is at rest, i.e. when the turbine 32, and therefore the robot, is at stop. In this configuration, both flaps 22*a* and 22*b* occupy an open position, which is their default position, and therefore keep the outlets 21a and 21b cleared.

In the open position, each flap 22 is pressed either directly against an adjacent wall 24 of the volute 20, as is the case of the flap 22b in FIG. 6, or against a stop 25 as shown in FIGS. 7a to 7c. This open position is elastically held thanks to a biasing force in the absence of pressure exerted by the water.

To this end, the flaps 22 may be either articulated via a torsion spring elastic means), or have a structural elasticity (flexibility).

According to the embodiment of FIG. 6, each flap 22 is articulated on a hinge comprising a torsion spring 23 which tends to urge the flap into its open position. In this case, the flaps 22 are preferably rigid, but could perfectly be semi-rigid, and possibly flexible.

According to the embodiment of FIGS. 7a to 7c, the flaps 22 are flexible and can be deformed between the open position and the closed position. In this case, the flaps are not articulated, but embedded at their attachment points 26.

In both cases, the flaps 22 are sized so as to switch from the open position into the closed position under the effect of pressure of the water ejected by the turbine 32 in this direction, and from the closed position into the open position under the effect of the biasing force.

FIG. 7b shows the volute 20 when the robot moves in the direction indicated by the arrow M (to the left of the figure). This direction of movement is due to the rotation of the turbine 32 in the positive direction, indicated by the symbol + in FIG. 7b, allowing generating a circulation of the sucked water in the same direction, which is brought to close the flap 22a (left flap in the figure) while keeping the opposite flap 22a open, thereby creating a one-direction water jet J through the outlet 21b which has remained open. The water thus ejected creates a propulsive force with an opposite direction according to the action and reaction principle.

Conversely, FIG. 7c shows the volute 20 when the robot moves in the direction opposite to the first one and indicated by the arrow M (to the right of the figure). In this case, the turbine 32 rotates in the negative direction, indicated by the symbol—in FIG. 7c, and generates a circulation of the sucked water in the same direction, thereby closing the flap 22b (straight flap in the figure) and keeping the opposite flap 22a, and therefore the corresponding outlet 21a, open. The resulting water jet J comes out through this outlet 21a and propels the robot in the opposite direction.

To be able to switch between the open position and the closed position, each flap 22 has a sufficient surface area on which the orthoradial pressure of the water is exerted when said flap is in the open position. In the embodiment of FIG. 6, this surface corresponds to a bent end 221 of the flap 22, whereas in the embodiment of FIGS. 7a to 7b, this surface can be reached through an aperture 251 formed in the stops 25 as shown in the section A-A of FIG. 7a.

The vacuum cleaner robot 100 can then move in two directions to circumvent the obstacles, by reversing its direction of movement when it encounters an obstacle, thanks to the reversal of the direction of rotation of the turbine 32 and more fundamentally of the direction of rotation of the drive shaft of the motor 31.

The reversal of the direction of rotation of the motor 31 is done when the robot 100 is immobilised against an obstacle such as a swimming pool wall. To this end, the robot 100 is equipped with a sensor allowing detecting stoppage of the robot 100. Such a sensor may be an inertial, gyroscopic, Hall-effect, hydrodynamic sensor, or any other type suited to the present application.

Control of the reversal of the direction of rotation of the motor 31, based on the information of the stop sensor of the robot, is controlled by the electronic board of the robot.

Incidentally, in order to avoid back-and-forth movements on the same trajectory, the robot 100 may include means using one or more steerable wheel(s), an articulated axle or deflectors to divert the propulsive water jet with a substantially large angle.

Finally, the robot may optionally include fixed or rotary brushes to improve the cleaning efficiency, especially when the bottom is dirty.

It appears from the present description that some non-essential elements of the vacuum cleaner robot could be modified, replaced or eliminated yet without departing from the scope of the disclosure defined by the claims hereinafter. For example, the robot may be powered on the mains via an electrical cable, include a water treatment integrated diffuser, have a motor located outside the main body to increase the volume of the debris compartment, etc.

What is claimed is:

1. A vacuum cleaner robot, submersible, for cleaning artificial basins, including: a main body comprising a debris container; a filter; a volute (20) with two discharge outlets; a suction and propulsion system producing a water circulation in the volute and a propulsive water jet; and electric power supply means, characterised in that the volute is fixed and includes a flap at each of said two discharge outlets having an open position and a closed position, the respective open and closed positions of said flaps automatically alternating according to the direction of the water circulation in the volute so as to reverse the direction of the propulsive water jet.

2. The vacuum cleaner robot according to claim 1, wherein the suction and propulsion system comprises an electric motor and a centrifugal turbine coupled to the motor, the rotation of said turbine in one direction producing a water circulation in the volute in the same direction.

3. The vacuum cleaner robot according to claim 2, wherein the turbine includes vanes that are orientable according to its direction of rotation.

4. The vacuum cleaner robot according to claim 1, wherein each flap has a position opposite to that of the other flap when the suction and propulsion system is activated, and a default open position when said suction and propulsion system is at stop.

5. The vacuum cleaner robot according to claim 1, wherein each flap is subjected to an elastic biasing force which tends to hold it in its open position.

6. The vacuum cleaner robot according to claim 5, wherein the biasing force is ensured by a torsion spring or by flexibility of the flap.

7. The vacuum cleaner robot according to claim 1, wherein the suction and propulsion system is configured to reverse the direction of water circulation in the volute when the robot is immobilised against an obstacle.

8. The vacuum cleaner robot according to claim 7, including a stop sensor for controlling the reversal of the direction of water circulation in the volute.

9. The vacuum cleaner robot according to claim 1, wherein the electric power supply means comprise an electric battery placed in a sealed compartment.

10. The vacuum cleaner robot according to claim 1, further including trajectory deviation means, the trajectory deviation means is a deflector of the propulsive water jet.

\* \* \* \* \*